United States Patent [19]

Degn

[11] Patent Number: 4,611,468
[45] Date of Patent: Sep. 16, 1986

[54] METHOD OF PRODUCING FROZEN BLOCK BODIES

[75] Inventor: Kaj H. Degn, Hasselager, Denmark

[73] Assignee: O.G. Hoyer A/S, Hojbjerg, Denmark

[21] Appl. No.: 699,559

[22] Filed: Feb. 8, 1985

[30] Foreign Application Priority Data

Feb. 9, 1984 [DK] Denmark ............................. 565/84

[51] Int. Cl.[4] ............................................. A23G 9/00
[52] U.S. Cl. ........................................ 62/71; 62/345; 425/126 S
[58] Field of Search ................ 62/345, 71; 425/126 S, 425/436 R, 444, 447

[56] References Cited

U.S. PATENT DOCUMENTS 2,303,013 11/1942 Wenzl, Jr. ........................... 425/438
3,489,103 1/1970 Hirahara et al. .................... 425/444

*Primary Examiner*—William E. Tapolcai
*Attorney, Agent, or Firm*—Antonelli, Terry & Wands

[57] ABSTRACT

It has been recognized long ago that stickless frozen block bodies of a size corresponding to the ice block bodies of ordinary ice lollies may be produced with the aid of standard freezing machines for producing the ice lollies, when these machines are modified such that the individual sticks are replaced by pin members on an uptake device as operable to lift a whole row of ice bodies up from their freezing pocket members, whereafter the ice bodies are caused to be retracted from the pins. However, the correct and automatic mounting of the uptake device relative the freezing pockets is very problematic, and the invention provides for the improvement that use is made of individual sticks for the single freezing pockets, whereby these sticks, prior to their final retraction from the ice bodies, may be handled automatically with the use of both mounting and retraction means, which are already highly developed for the production of ice lollies. The applied individual sticks may be of a cheap and poor quality for use once only, or they may be of a high quality for repeated use.

3 Claims, 3 Drawing Figures

METHOD OF PRODUCING FROZEN BLOCK BODIES

The present invention relates to the industrial production of frozen material blocks, particularly though not exclusively stickless ice cream lollies. The size of small icecream blocks or bodies as constituting an alternative to stick carrying ice lollies is principally the same as the size of the ice blocks of the latter, and they are even packed in much the same way as these. It has been natural, therefore, to seek to make use, as far as possible, of ordinary ice lolly production machines for the freezing and packaging even of stickless lollies.

In ordinary ice lolly production machines the lolly blocks are frozen by means of a movable freezing table having a large number of downwardly projecting freezing pocket members arranged either in parallel rows, when the table is moved straightlined or in radial rows, when the freezing table is of the rotary type, the table being moved stepwise over a freezing bath with the pocket members projecting down into this bath. The rows of pocket members are successively filled with ice cream or lemonade as the rows pass underneath a filling station, in which all of the pocket members of each row are filled simultaneously, whereafter the freezing is effected during the following movement of the pocket members through or along the freezing bath. In the production of ordinary ice lollies the rows of pocket members pass a stick mounting station, in which sticks are automatically lowered into the lolly blocks as here already partly frozen, such that the ice blocks or bodies can now, themselves, stabilize and hold the mounted sticks during the following phase, where the sticks are frozen fast in the ice bodies.

When the ice bodies have been frozen to the desired degree the pocket members proceed to a heating zone, in which they are heated for initial melting of the inner surface layer of the ice bodies, such that these may thereafter, by arrival at a demoulding station, slip the pocket members when they are caused to be lifted therefrom. This lifting, as far as the stick carrying lolly bodies are concerned, is effected in an at least principally simple manner with the use of a row of gripping tools, which are caused to grip the upwardly projecting ends of the sticks and to thereafter pull these and the associated ice bodies up from the pocket members, whereafter the gripping tools move the gripped lollies to a release station, in which the lollies are released and deposited on conveyor means bringing them to an automatic packing station.

A corresponding production method could well be used for stickless ice bodies, if the gripping means were modified to be able to grip the ice bodies in a direct manner, e.g. with the use of sucking discs, but various attempts in this direction have generally failed.

The desire of making use, as far as possible, of the ordinary ice lolly machines for the production of the stickless ice bodies has, long ago, resulted in a modification, according to which a rake like implement is lowered over each row of pocket members such that downwardly protruding pin shaped rake teeth are lowered into the respective pocket members, thus imitating the presence of sticks therein; in the demoulding station it is then sufficient to successively lift the rakes with all the ice bodies hanging on the pins, move the rakes to a position overhead the said conveyor means and then cause the ice bodies to be stripped off the rake pins, e.g. by introducing a holding comb behind the ice bodies and retracting the rake. The ice bodies will thus be delivered to the packaging station with small holes after the retracted rake pins, and these holes are fully acceptable in the final product.

The above lifting and stripping operation is rather easy to carry out automatically, but practice has shown, through long time, that very difficult problems are connected with the automatic mounting of the rake implements over or in the consecutive rows of pocket members. Principally this should be rather easy, but in practice a reliable automatic handling of the rakes is so expensive that quite generally it has been preferred to effect the mounting of the rakes purely manually, even though this, of course, is also expensive.

It is the purpose of the invention to provide an improved method, whereby frozen stickless blocks are produceable in a safe automatic manner at low costs.

The invention is built on the simple recognition that a stickless ice body may be produced almost exactly like a stick carrying lolly body, when the stick is treated as a disposable element, which is removed from the ice body either for destruction or, if cleaned, for renewed use. The removal of the sticks will be as easy as the described retraction of the rake pins of the known method, and what is particularly important is that the sticks can be mounted in the freezing pocket members with a high degree of safety, viz. by means of the stick handling and mounting equipment which has already been developed for the production of stick lollies and is already present on the relevant freezing machines, because these, as a rule, should also be able to produce stick carrying lollies. Thus, these machines will also already be equipped with the necessary means for gripping the protruding stick ends and move the lollies to the position in which they are dropped onto the said conveyor means. The only required modifications will be to arrange for the gripping means to cooperate with a holding comb structure or the like for pulling off the lolly bodies from the sticks in the dropping station and to arrange for the gripping means to release the empty sticks over a suitable collection area. Such modifications, however, are easily made so as to be an operative alternative to the usual operation of the gripping means.

The sticks themselves should serve no purpose other than enabling the ice bodies to be lifted off the pocket members and be moved to the dropping station and be released therein for further handling, and the sticks, therefore, may be particularly adapted to this limited purpose. Thus, they may be particularly cheap, for use once only, or they may be particularly durable and otherwise well suited for repeated use, e.g. in being easy to clean, and in that case it may well be acceptable that the sticks could be more expensive than ordinary wooden sticks for ice lollies. By way of example the sticks may consist of metal such as stainless stell, plastic of high quality, or suitably treated wood.

As mentioned, the sticks may even be very cheap, for use once only, e.g. consisting of scrapwood, but they should be of such a character that they are retractable from the ice bodies without forming large retraction craters therein, this condition of course also existing for the known retractable rake teeth.

In accordance with the above the invention is characteristic primarily by the method steps as stated in claim 1. Thus, the conventional pin rakes are substituted by individual sticks or pins, which, in both the mounting and the demoulding phases, can be handled fully automatically by the already existing handling equipment for the production of ordinary stick carrying lollies.

In the following the invention is described in more detail with reference to the drawing, in which.

Figure 1:
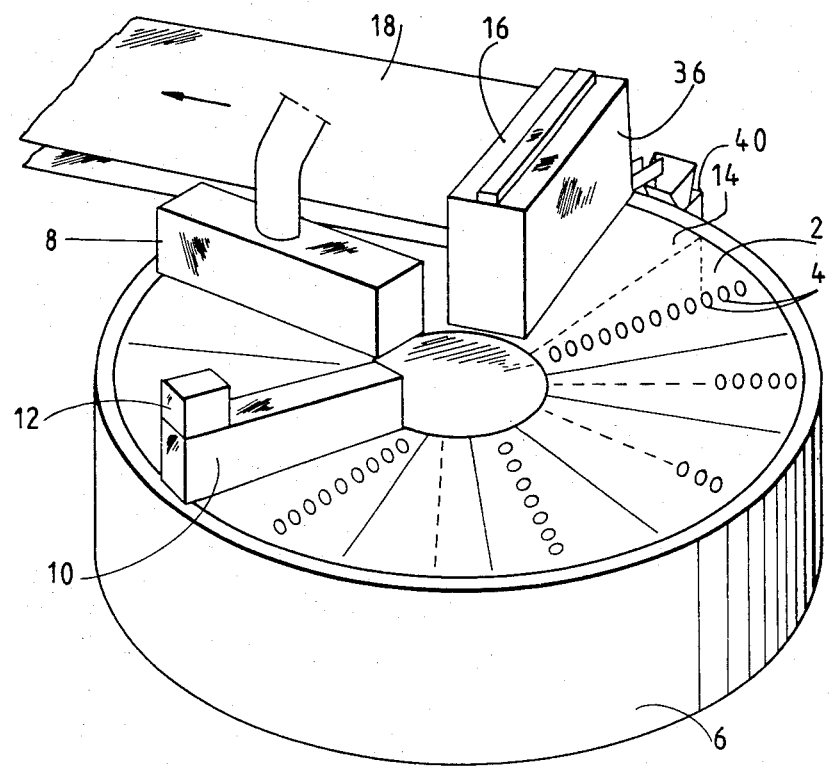
FIG. 1 is a schematic perspective view of an ice lolly producing machine.

The production machine shown in FIG. 1 is of a generally well known type and will, therefore, be described very briefly only. It comprises a round stepwise rotating table unit 2 provided with a large number of downwardly protruding freezing pocket members 4 arranged in radial rows. The table unit 2 is arranged as a top side of a vat 6, which, in a major part thereof, contains a freezing medium such as brine, into which the pocket members 4 project. By the rotation of the table 2 the single pocket member rows pass underneath a filling station 8, in which the single pocket members are filled with ice cream or lemonade, and at a later stage, when the liquid has been partly frozen, the same rows pass underneath a station 10, in which lolly sticks are automatically put down into the single pockets, the sticks being supplied from a stick magazine 12. During the further rotation of the table 2 the ice bodies in the pockets 4 will be further frozen so as to freeze fast the said sticks therein. At a later stage the pocket members 4 are moved into a heating zone 14, in which the pocket members are heated from outside to cause slippage between the single ice body and its pocket member. Thereafter, in a demoulding station 16, the exposed upper stick portions are gripped by gripping tools which are operated to lift the stick/ice body units off the pocket members and swing these units into a position overhead a conveyor belt 18 and then release the units such that these fall down on the belt 18 for movement thereon into a non-illustrated packaging station.

So far described the machine shown is an ordinary production machine for stick carrying ice lollies.

Figure 2:
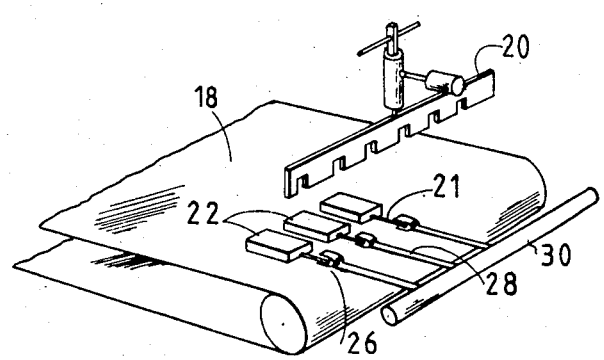
FIG. 2 is a perspective view of a modified part or station thereof.
Figure 3:
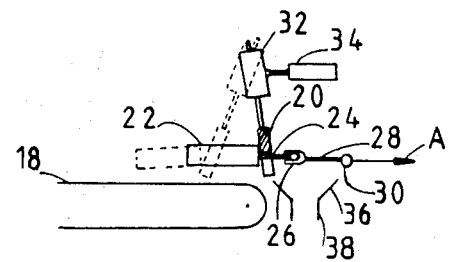
FIG. 3 is a side view of the station shown in FIG. 2.

In connection with the invention it is required that the ice lollies, upon retraction from their freezing pockets 4, are drawn off their respective sticks, and to this end the demoulding station 16 is provided with special means for effecting such an off-drawing, when required. In the example shown in FIGS. 2 and 3 these means consist of a comb member 20, which is arranged so as to cooperate with the rear end of the stick carried ice bodies, designated 22, with sticks designated 24. The said gripping means are constituted by conventional grippers 26 as mounted on parallel gripper arms 28 associated with a common, movable carrier shaft 30. The comb member 20 is movable by a control cylinder 32 so as to be lowerable behind the rear ends of the ice bodies 22, as shown in FIG. 3, and an additional working cylinder 34 is operable to cause the comb member 20 to be moved forwardly relative the gripped stick 24, whereby the ice body is pushed off the stick, as shown in dotted lines, and falls down on the conveyor belt 18. Thus, the stickless ice bodies will then be brought to the said packaging station.

After the release of the ice bodies 22 from the sticks 24 the gripping members 26, still holding the sticks, are moved rearwardly as shown by an arrow A in FIG. 3, and the sticks are hereby brought into a position overhead a hopper 36. In this position the gripping members 26 are deactuated, whereby the sticks fall down into the hopper, and the gripping members are then moved further, back into their positions for gripping the exposed stick ends of the ice bodies in the next row of freezing pocket members as arriving in the demoulding station.

An outlet 38 from the hopper 36 is connected to a collector container (not shown) for collecting the used sticks 24. When the sticks are of a cheap, disposable type, the collected sticks may be thrown out, while reusable sticks should be fed to a cleaning station. In the latter case the sticks may be fed to a cleaning station in a continuous manner directly through the outlet 38. In FIG. 1 such a cleaning station is shown schematically at 40, and in a manner not shown the output end of the cleaning station may be flow connected with the stick magazine 12 for successive supply of sticks thereto.

In machines handling and delivering the ice lollies with unchanged vertical orientation the comb member will lie horizontally and be horizontally reciprocal so as to cooperate, in its active position, with the existing means for lifting the ice lollies, such that the sticks are retracted vertically from the lolly bodies above the conveyor 18 or other receiver means and then moved to their own dropping station.

It should be mentioned that it is possible to make use of an average between disposable and reusable sticks, viz. "sticks", which consist of a suitably stiff wire material, which is supplied to the stick mounting station from a supply reel so as to be consecutively cut off with a suitable length, whereby the single wire "sticks" could well be reusable, but all the same are so cheap that they may as well or even better be used once only, i.e. without any need of a special cleaning station.

With the use of wooden sticks, round or flat or in pairs of two round sticks, the sticks may be paraffined or correspondingly treated for easy retraction from the ice bodies, inasfar as the sticks should adhere to the frozen ice bodies only so as to ensure that these bodies can be lifted from the freezing pockets by an upward pull in the exposed upper stick ends. Even stick materials other than wood may be correspondingly treated.

Principally it is unimportant for the invention whether the substance to be frozen is ice cream or lemonade or any other substance. Thus, the invention will even comprise the production of other types of materials, e.g. freeze-dried coffee extracts or spinach for block freezing, whenever the production is based on the use of a machine of the ice lolly producing type.

What is claimed is:

1. A method for producing stickless frozen block bodies with the use of a freezing machine which produces stick-carrying frozen block bodies of the ice cream lolly type, comprising the steps of
  filling freezing pocket members with the substance to be frozen,
  freezing the substance into block bodies in the freezing pocket members, while the freezing pocket members are moved through a freezing zone,
  handling and inserting individual sticks by means of automatic handling means into the freezing pocket members during the freezing of the substance into block bodies such that one end of the sticks protrudes outwardly from the block bodies,
  moving the freezing pocket members to a demoulding station at which time the sticks are frozen fast in the block bodies,
  gripping the protruding end of the sticks by gripping means at the demoulding station and lifting the sticks to remove the block bodies from the freezing pocket members, removing the sticks from the block bodies by combing means cooperating with surface portions of the block bodies such that there is relative retraction movement between the gripping means and the combing means, disposing of the removed sticks, and delivering the stickless block bodies to a receiver delivering the stickless block bodies to a receiver station.

2. A method for producing stickless frozen block bodies with the use of a freezing machine which produces stick-carrying frozen block bodies of the ice cream lolly type, comprising the steps of filling freezing pocket members with the substance to be frozen, freezing the substance into block bodies in the freezing pocket members, while the freezing pocket members are moved through a freezing zone, handling and inserting individual sticks by means of automatic handling means into the freezing pocket members during the freezing of the substance into block bodies such that one end of the sticks protrudes outwardly from the block bodies, moving the freezing pocket members to a demoulding station at which time the sticks are frozen fast in the block bodies, gripping the protruding end of the sticks by gripping means at the demoulding station and lifting the sticks to remove the block bodies from the freezing pocket members, removing the sticks from the block bodies by combing means cooperating with surface portions of the block bodies such that there is relative retraction movement between the gripping means and the combing means, returning the removed sticks to the automatic handling means, and delivering the stickless block bodies to a receiving station.

3. A method according to claim 2, wherein the method further includes passing the removed sticks through a cleaning station before they are returned to the automatic handling means.

* * * * *